United States Patent [19]
Ichino

[11] Patent Number: 5,724,196
[45] Date of Patent: Mar. 3, 1998

[54] LENS BARREL

[75] Inventor: Kazushige Ichino, Tokyo, Japan

[73] Assignee: Canon Kabushiki Kaisha, Tokyo, Japan

[21] Appl. No.: 687,906

[22] Filed: Jul. 30, 1996

Related U.S. Application Data

[63] Continuation of Ser. No. 116,328, Sep. 3, 1993, abandoned.

[30] Foreign Application Priority Data

Sep. 9, 1992 [JP] Japan .................................. 4-240442

[51] Int. Cl.$^6$ .................................................. G02B 7/02
[52] U.S. Cl. ........................ 359/823; 359/699; 359/704
[58] Field of Search .................................... 359/699, 703, 359/704, 823, 813, 827; 74/458

[56] References Cited

U.S. PATENT DOCUMENTS 4,439,018  3/1984  Okajima et al. .................. 359/699
4,478,103  10/1984  Benjamin .......................... 74/458

FOREIGN PATENT DOCUMENTS 63-306410  12/1988  Japan .

*Primary Examiner*—David C. Nelms
*Assistant Examiner*—Thomas Robbins
*Attorney, Agent, or Firm*—Robin, Blecker, Daley and Driscoll

[57] ABSTRACT

A lens barrel is arranged to include a first cam ring having a helicoid part helicoid-connected to the frontmost group of an optical system and a cam part arranged to restrict a front of at least a part of a rear group of the optical system located in rear of the frontmost group and a second cam ring connected to the first cam ring and having a cam part arranged to restrict a rear of the rear group, or a spur-gear helicoid having a spur gear part and a helicoid part arranged to spatially overlap each other, a spur gear which engages the spur gear part of the spur-gear helicoid, a helicoid part which engages the helicoid part of the spur-gear helicoid and a lens barrel system to which a rotation force is transmitted by the engagement between the spur gear part and the spur gear and to which a moving force in the direction of an optical axis is transmitted by the engagement between the helicoid part and the helicoid, or to include a first group of an optical system, a second group of the optical system disposed adjacent to the first group, a diaphragm, a first elastic member disposed between the first group of the optical system and the diaphragm and a second elastic member disposed between the second group of the optical system and the diaphragm.

38 Claims, 19 Drawing Sheets

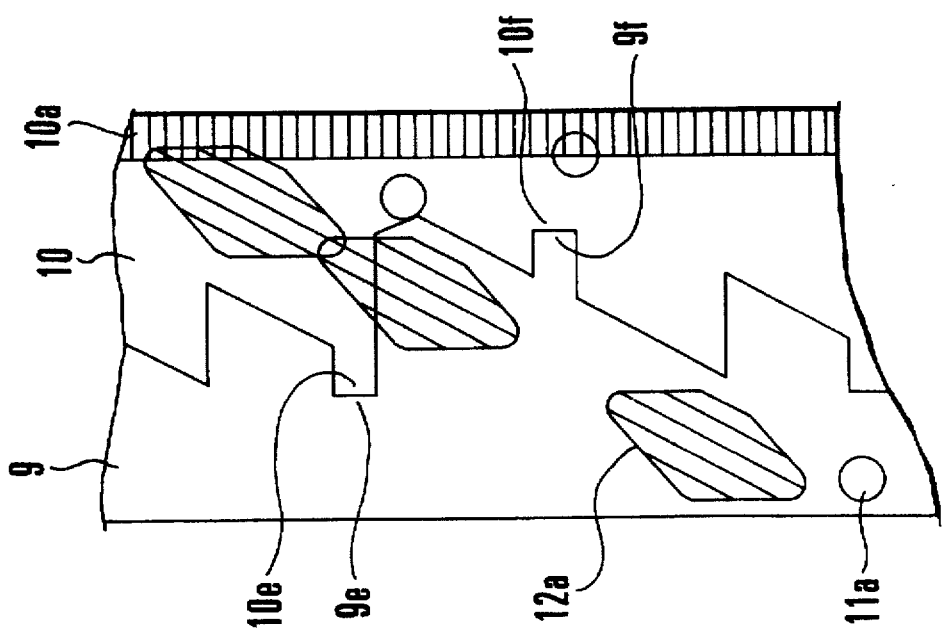
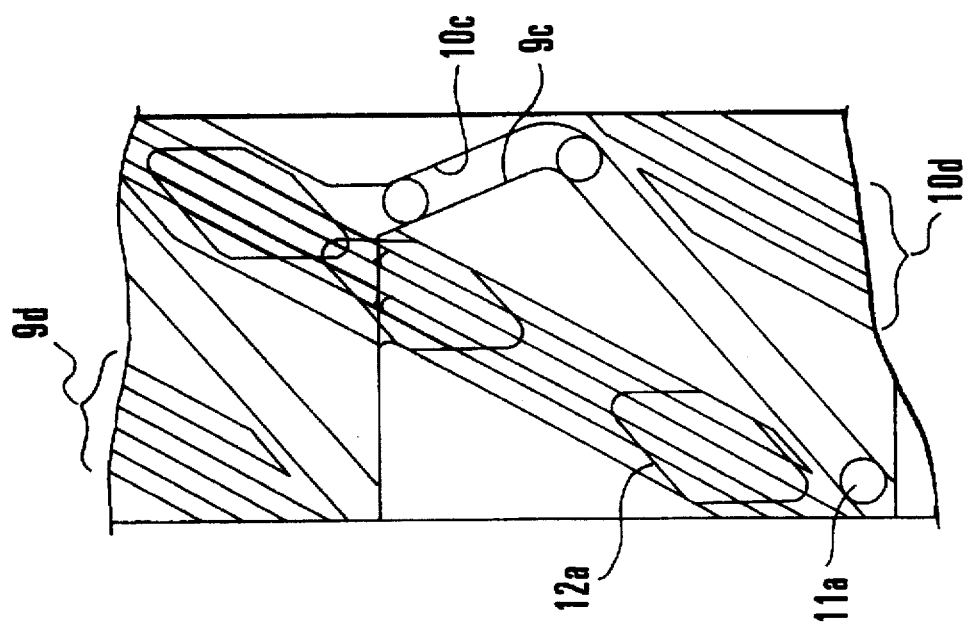

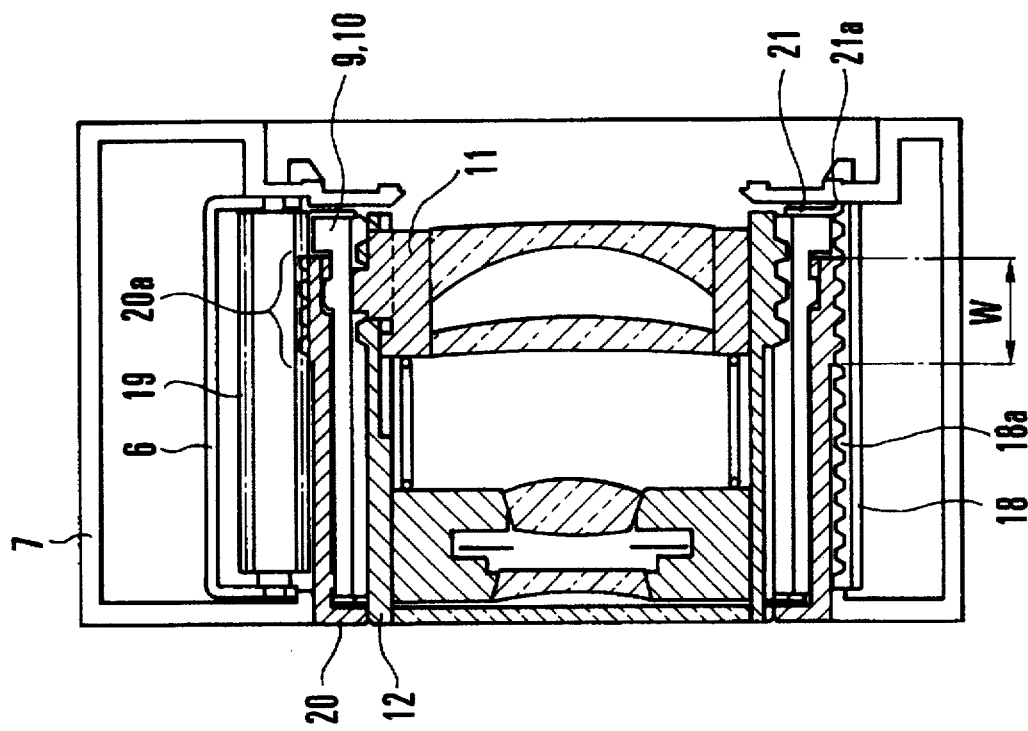
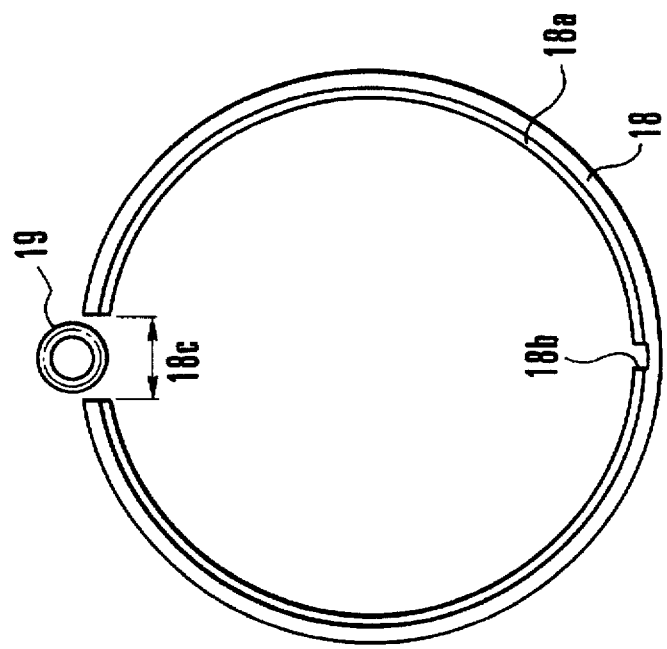
FIG.15(a)
FIG.15(b)

LENS BARREL

This is a continuation application under 37 CFR 1.62 of prior application Ser. No. 08/116,328, filed Sep. 3, 1993 now abandoned.

BACKGROUND OF THE INVENTION

1. Field of the Invention

This invention relates to a lens barrel having lenses and a diaphragm mechanism disposed therein, and more particularly to a lens barrel including therein a lens-driving mechanism and a diaphragm mechanism which have various improved functions compared with those of the conventional lens-driving and diaphragm mechanisms.

2. Description of the Related Art

Many mechanisms have heretofore been developed for drawing out the lens of a camera. A typical example of the known lens drawing-out mechanisms is arranged as follows. Three cam pins are erected on a lens holding frame. A rectilinear movement tube is provided with straight slots having a sufficient width to aptly engage these cam pins in such a way as to allow the lens holding frame to linearly slide along an optical axis without rotating. A cam tube which has such a cam face that gives a required optical performance is arranged in combination with the rectilinear movement tube to allow the lens holding frame to be drawn out and drawn in. To increase the precision of the cam face, an inner cam tube has been developed to have a cam face formed without breaking the wall of the cam tube.

Another known lens drawing-out mechanism is composed of, for example, a differential mechanism. FIGS. 20 and 21 show the arrangement of this lens drawing-out mechanism using the differential mechanism.

Referring to FIGS. 20 and 21, a female helicoid tube 101b is secured to a camera body 101 to be in one body with it. A lens barrel 102 which has a male helicoid 102a formed in one body therewith is fitted in the female helicoid tube 101b. A part of the periphery of the male helicoid 102a is replaced with a spur gear 102b which has the same lead as the male helicoid 102a. A hole 101a is formed in a part of the female helicoid tube 101b to allow the spur gear 102b of the lens barrel 102 to engage a spur gear 103. When the spur gear 103 is caused to rotate by a driving force which is not shown, the lens barrel 102 is drawn out while being caused to rotate by being guided by the female helicoid tube 101b. Then, a cam arrangement which is not shown but is disposed within the lens barrel 102 comes to further protrude from inside of the lens barrel 102 by receiving the rotating force of the lens barrel 102.

Meanwhile, some cameras have been developed to have a so-called moving stop (diaphragm) mechanism in addition to the lens driving mechanism described above. A stop plate which is made of a plate-shaped member having a minimum necessary hole for not blocking an optical path necessary for the shooting operation of the camera is employed as the moving stop mechanism for a zoom camera. The moving stop mechanism is generally arranged to move between the last lens surface and a film surface.

However, the conventional arrangement described above has presented the following problems.

(i) The inner cam tube requires a cutting process if it is to be formed as a discrete part or brings about an undercut if it is molded. In view of this, the inner cam tube must be arranged in two pieces. In the case of arrangement to draw out the lens holding frame by a combination of inner cams and cam pins, position control depends on the small contact areas obtained at three points, (three lines, to be more exact) between three cam pins and cam faces. Therefore, when the lens holding frame which protrudes toward the object from the camera body happens to hit something or receives some external force, a recess might be formed in the cam face by the impact of the accident. The optical performance of the lens barrel has been affected by such a recess.

(ii) In the case of the differential mechanism, the lens barrel must have a length which is a sum of the length of the male helicoid 102a and that of the spur gear 102b. This has caused an increase in size of the lens barrel to hinder efforts to reduce the size of the camera.

(iii) The arrangement to put the moving stop plate in between a plurality of moving lens groups may improve the photo-taking performance. However, it has been difficult to have such an intermediate moving stop mechanism arranged to move and to keep its position in a space for passing light between lens groups.

SUMMARY OF THE INVENTION

The present invention is directed to the solution of the above-stated problems of the prior art.

It is one aspect of the invention to provide a lens barrel, wherein the foremost group of an optical system which is apt to directly receive an impact by accidental collision with something is arranged to receive the impact at a helicod part which has a large contact area and, in addition to this, two cam parts for a rear group are formed by connecting two pieces without any undercut in such a way as to be strong against impacts, so that the optical performance of the lens barrel is never affected by such an impact or the like. To obtain this aspect, a lens barrel according to the invention includes a first cam ring having a helicoid part helicoid-connected to a frontmost group of an optical system and a cam part arranged to restrict a front of at least a part of a rear group of the optical system located in rear of the frontmost group, and a second cam ring connected to the first cam ring and having a cam part arranged to restrict a rear of the rear group.

It is another aspect of the invention to provide a lens barrel which is arranged to be capable of transmitting a rotation force and a moving force in the direction of an optical axis within an area of a short width, so that the lens barrel can be compactly arranged.

To obtain that aspect, a lens barrel arranged in accordance with the invention includes a spur-gear helicoid having a spur gear part and a helicoid part arranged to spatially overlap each other, a spur gear arranged to engage the spur gear part of the spur-gear helicoid, a helicoid arranged to engage the helicoid part of the spur gear helicoid, and a lens barrel system to which a rotation force is transmitted by the engagement between the spur gear part and the spur gear and to which a moving force in the direction of an optical axis is transmitted by the engagement between the helicoid part and the helicoid.

It is a further aspect of the invention to provide a lens barrel which is capable of determining the position of a diaphragm with a simple arrangement.

To obtain the above-stated aspect, a lens barrel arranged in accordance with the invention includes a first group of an optical system, a second group of the optical system disposed adjacent to the first group of the optical system, a diaphragm, a first elastic member disposed between the first group of the optical system and the diaphragm, and a second elastic member disposed between the second group of the optical system and the diaphragm.

These and other aspects of the present invention will become apparent from the following description of preferred embodiments thereof in conjunction with the accompanying drawings.

BRIEF DESCRIPTION OF THE DRAWINGS

FIG. 5 is an oblique development view showing the outer sides of the same cam rings 9 and 10.

FIG. 6 is another oblique development view showing the outer sides of the same cam rings 9 and 10.

FIGS. 15(a) and 15(b) are respectively a front view and a sectional view showing a camera arranged according to the invention as a fourth embodiment thereof.

DETAILED DESCRIPTION OF THE PREFERRED EMBODIMENTS

Figure 1:
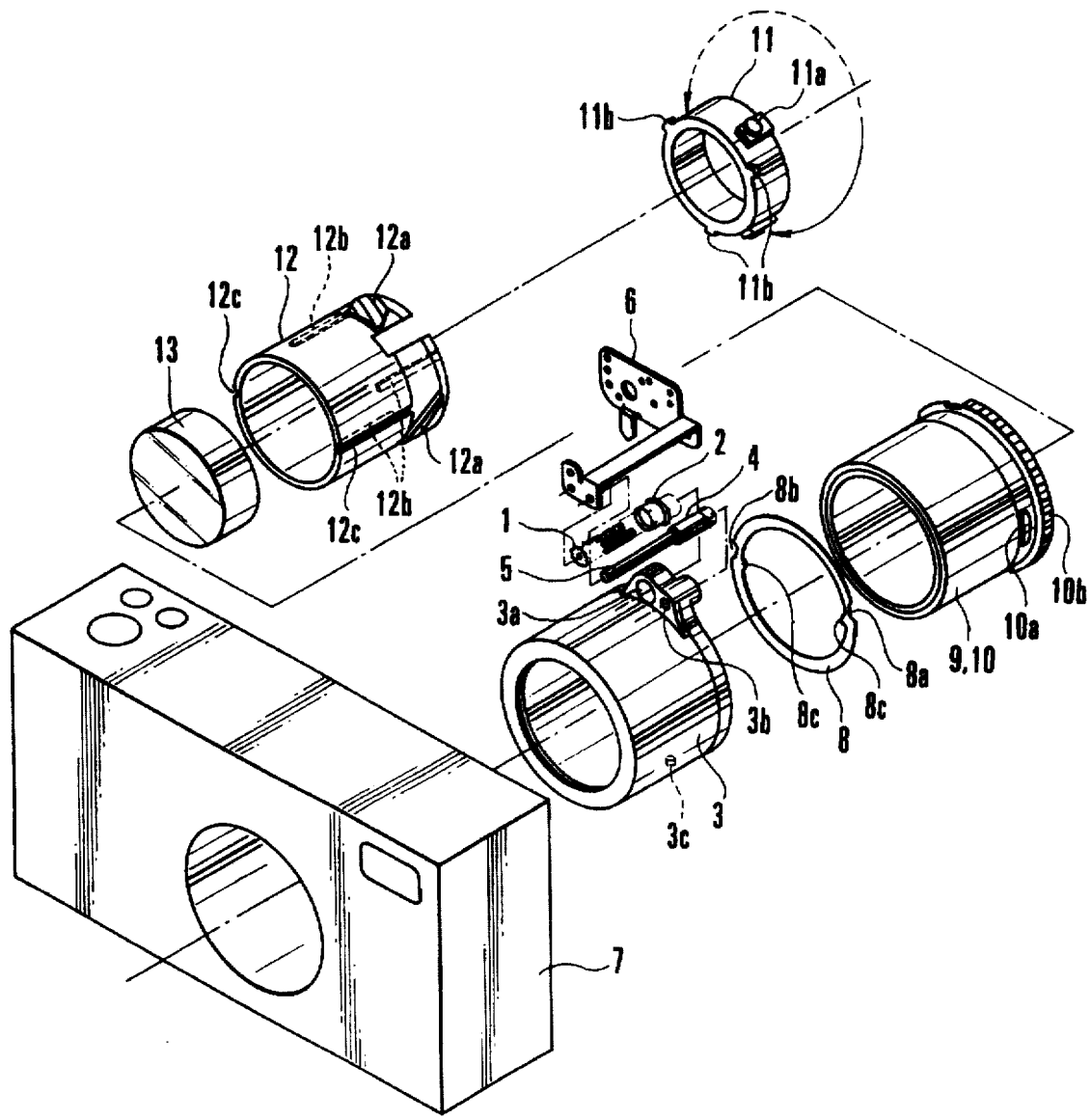
FIG. 1 is an exploded oblique view showing the essential parts of a camera arranged according to the invention as a first embodiment thereof.
Figure 2:
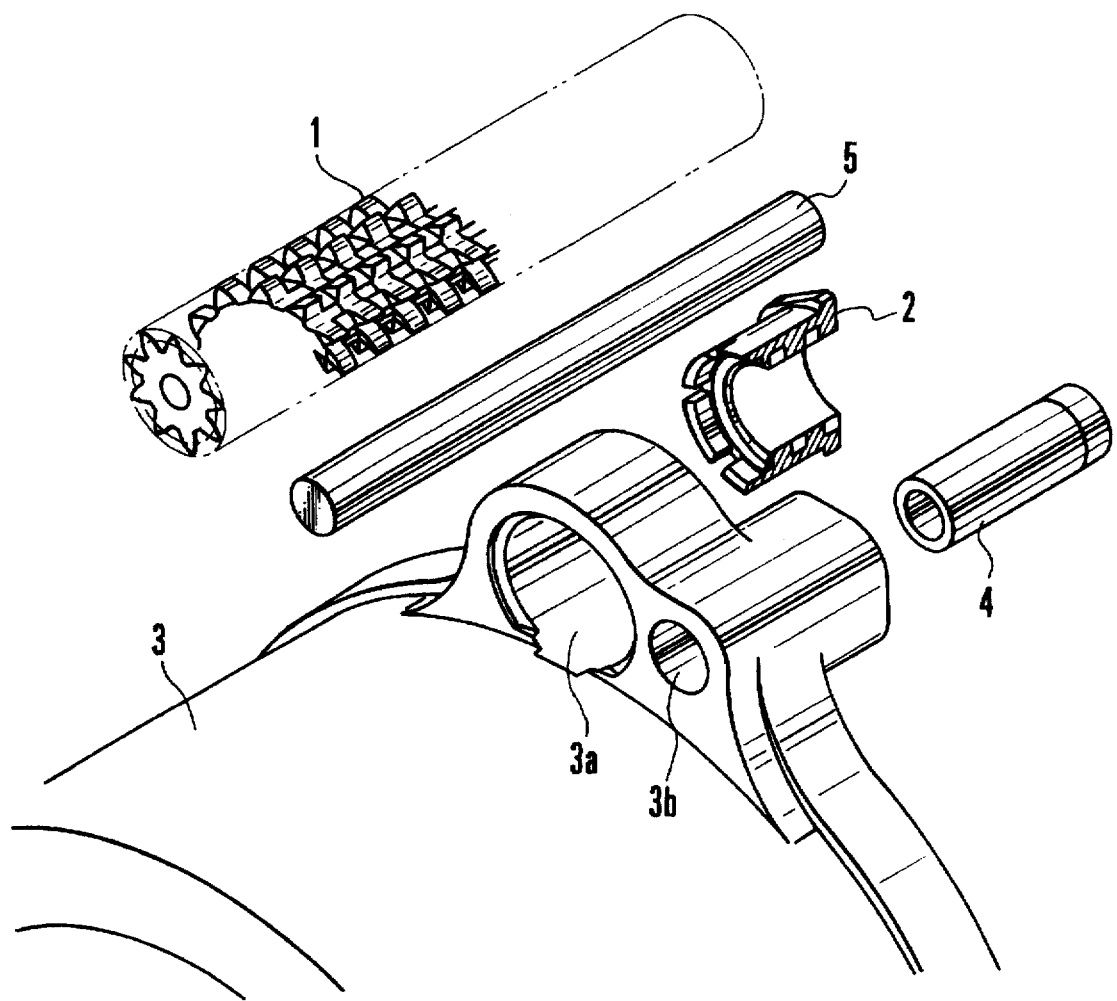
FIG. 2 is an enlarged view of a part of FIG. 1.
Figure 3:
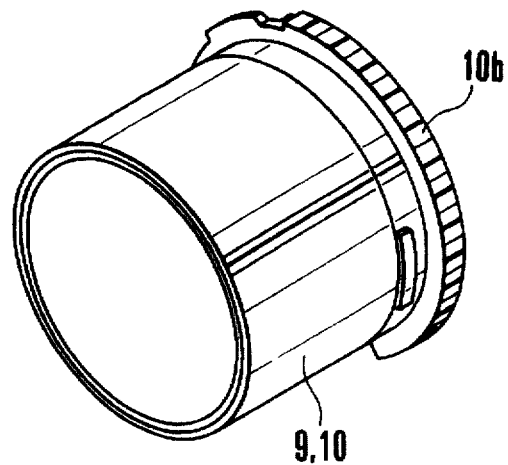
FIG. 3 is an enlarged view showing a part of the arrangement shown in FIG. 1.

FIG. 1 is an exploded oblique view showing a camera which is arranged as a first embodiment of the present invention. FIG. 2 is an enlarged oblique view showing the essential parts of the first embodiment. The first embodiment of the invention is described below with reference to FIGS. 1 to 9.

A spur-gear helicoid 1 is a long rod-like gear having a spur-gear shape as viewed on a section taken perpendicularly to its axis and has a male helicoid thread part spatially overlapping the spur gear part. FIGS. 1 and 2 show only in part the actual shape of the spur-gear helicoid 1. A helicoid bush 2 which is secured in a hole 3a provided in a lens barrel 3 has a female helicoid thread arranged thereon to engage the male helicoid thread part of the spur-gear helicoid 1. A fitting bush 4 is also secured to another hole 3b. A fitting bar 5 which is slidably fitted into the fitting bush 4 and the spur-gear helicoid 1 which fitly engages the helicoid bush 2 in such a way as to be movable back and forth by rotation are respectively hung at their two ends on a guide press 6. The spur-gear helicoid 1 is rotatable relative to the guide press 6 while the fitting bar 5 is secured to the guide press 6, for example, by caulking. Both of them are arranged to be not movable in the direction of an optical axis with respect to the guide press 6. In other words, the lens barrel 3 is in a state of being carried by the guide press 6. The guide press 6 is secured to a camera body 7. The lens barrel 3 is provided with a projection 3c on one side opposite to the holes 3a and 3b. The projection 3c is fitted in a rail groove (not shown) formed in the camera body 7 in such a way as to be movable in the direction of the optical axis. By virtue of this arrangement, the lens barrel 3 is movable back and forth when the spur-gear helicoid 1 is caused to rotate forward and backward by a force which is not shown.

A plate-like ring 8 is fitted in the less barrel 3. Notches 8a and 8b provided in the periphery of the ring 8 engage projections which are not shown but are arranged on the inside of the lens barrel 3 so as to prevent the ring 8 from rotating around the optical axis. In the rear of the ring 8, a front cam ring 9 and a rear cam ring 10 are rotatably fitted in the lens barrel 3 to be rotatable as one body along the inner circumference of the lens barrel 3. The rear cam ring 10 is provided with a projection 10a which protrudes from a part of the periphery of the rear cam ring 10 to have it engaged with the lens barrel 3 by a bayonet mechanism. This arrangement enables the front and rear cam rings 9 and 10 to rotate, except some rotation angle part, relative to the lens barrel 3 without sliding in the direction of the optical axis relative to the lens barrel 3. These cam rings 9 and 10 move integrally with the lens barrel 3 when the lens barrel 3 moves in the direction of the optical axis. The rear cam ring 10 is further provided with a spur gear 10b which is formed on the periphery of the rear cam ring 10 by the same module as the spur gear part of the spur-gear helicoid 1 and is thus arranged to engage the spur gear part of the spur-gear helicoid 1. Therefore, the front and rear cam rings 9 and 10 rotate backward and forward as the spur-gear helicoid 1 rotates forward and backward.

With the embodiment arranged as described above, when the spur-gear helicoid 1 is caused to rotate by a rotating force which is not shown, the lens barrel 3 moves back or forth. Then, the front and rear cam rings 9 and 10 rotate within the lens barrel 3 while they are moving back or forth integrally with the lens barrel 3.

Figure 4:
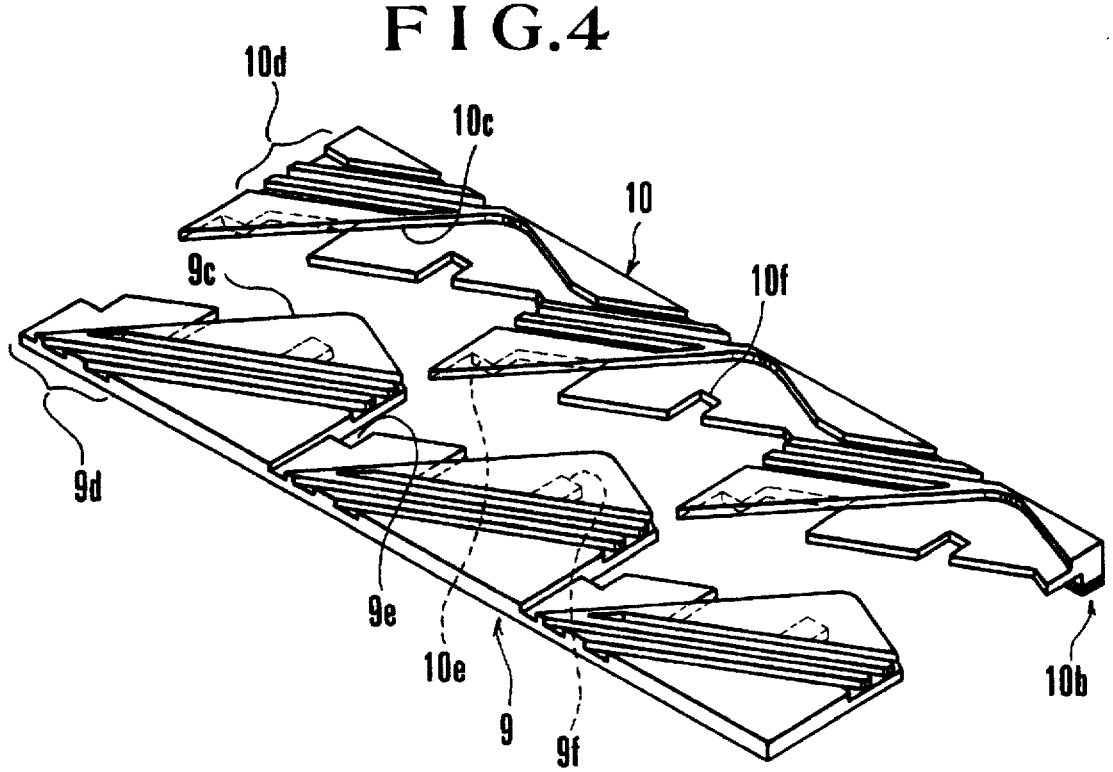
FIG. 4 is an oblique development view showing the inner side of a front cam ring 9 and that of a rear cam ring 10 shown in FIG. 1.

FIG. 4 shows the inner side arrangement of the front and rear cam rings 9 and 10 in a developed shape. FIG. 6 shows, also in a developed shape, the engaging manner of the front and rear cam rings 9 and 10 as viewed from outside. As shown in FIG. 6, a notch 9e engages a projection 10e, while a projection 9f engages a notch 10f. In other words, the front and rear cam rings 9 and 10 are discretely formed by molding and are arranged to rotate together by virtue of their engagement through the projections and notches when they rotate. The front and rear cam rings 9 and 10 respectively have a front cam face 9c, a rear cam face 10c and portions of female helicoid grooves 9d and 10d. These parts are formed likewise in each of three evenly divided 120 degree areas. Further, FIG. 5 shows these cam faces and helicoid grooves as viewed from outside in a see-through manner. As shown in FIG. 5, cam pins 11a are arranged to slide between the cam faces 9c and 10c. Raised male helicoid strips 12a which are parts of a plurality of male helicoids (will be described later) are arranged to fit into female helicoid grooves 9d and 10d. In this case, with a possible discrepancy in phase between the helicoid groove 9d of the front cam ring 9 and the helicoid groove 10d of the rear cam ring 10 taken into consideration, the helicoid groove 10d of the rear cam ring 10 is arranged to allow some play to the raised male helicoid strip 12a.

Figure 7:
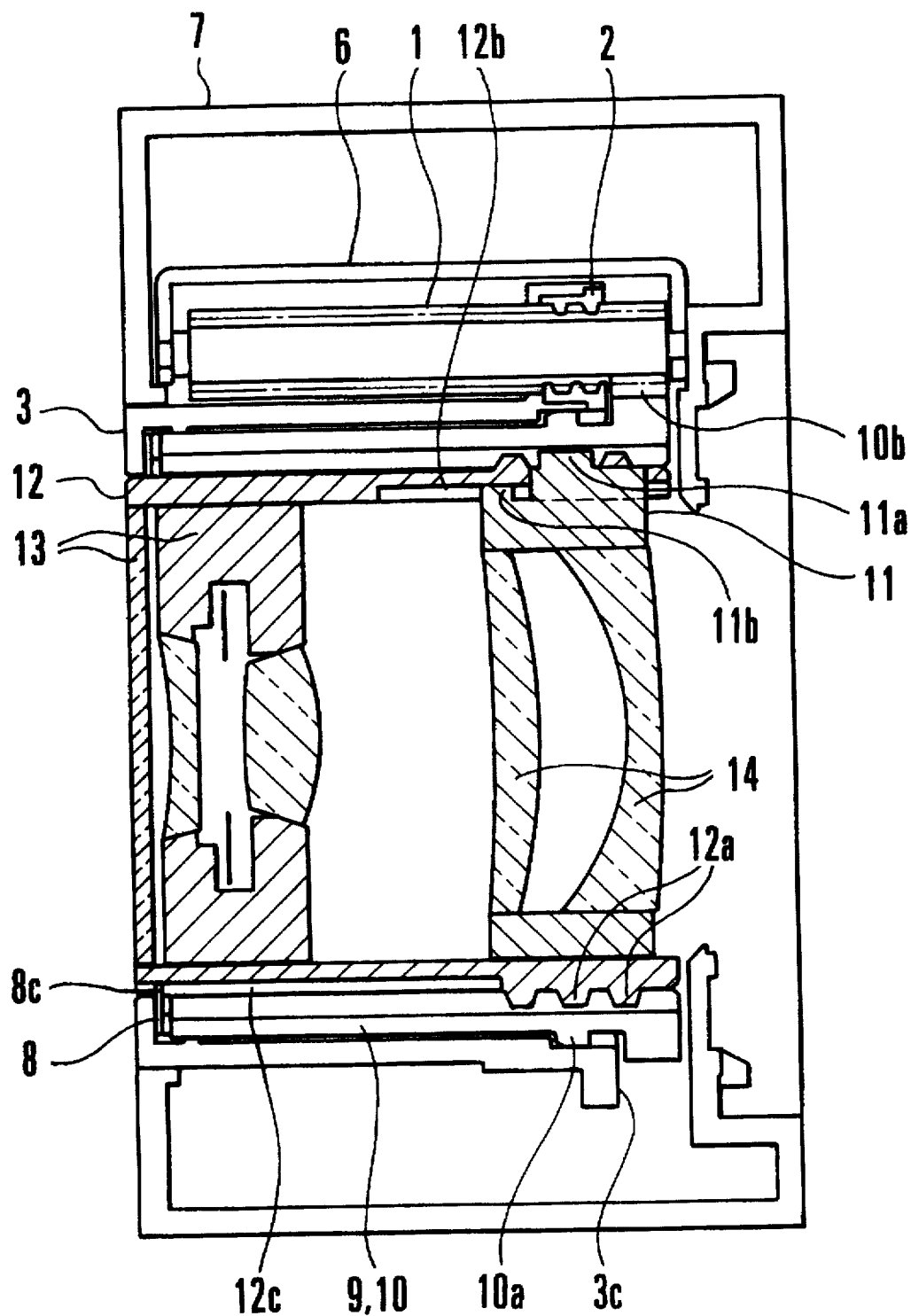
FIG. 7 is a sectional view showing an operating state of the camera shown in FIG. 1.

Referring to FIG. 7, the raised male helicoid strips 12a are arranged at three evenly divided 120 degree parts on the periphery of a front group tube 12, which is arranged to carry a front group optical part 13. The cam pins 11a are arranged at three evenly divided 120 degree parts on the periphery of a rear group tube 11, which is arranged to carry a rear group optical part 14 (not shown in FIG. 1). There are three grooves 12b in the inner side of the front group tube 12. Three projections 11b provided on the rear group tube 11 are fitted in the three grooves 12b in such a way as to be slidable in the direction of the optical axis. The front group tube 12 and the rear group tube 11 are thus arranged to be slidable relative to each other but not rotatable around the optical axis. Two grooves 12c are formed in two opposite positions on the periphery of the front group tube 12. The ring 8 has projections 8c formed on the inner circumference thereof in two positions corresponding to the two grooves 12c. After completion of assembly work, the projections 8c slidably engage the grooves 12c to allow the front group tube 12 to slide, but prevent the front group tube 12 from rotating, relative to the lens barrel 3.

By the arrangement described above, the front group tube 12 and the rear group tube 11 are fitted into the front and rear cam rings 9 and 10. Then, when the front and rear cam rings 9 and 10 are fitted into the lens barrel 3, the rotating forces of the front and rear cam rings 9 and 10 are transmitted to the raised male helicoid strips 12a and the cam pins 11a as driving forces. The driving forces cause the front group tube 12 and the rear group tube 11 to move in the direction of the optical axis while changing an interval between them relative to the lens barrel 3. A focus adjusting action or focal length varying action is performed with the front and rear group tubes 12 and 11 moved in this manner.

Figure 8:
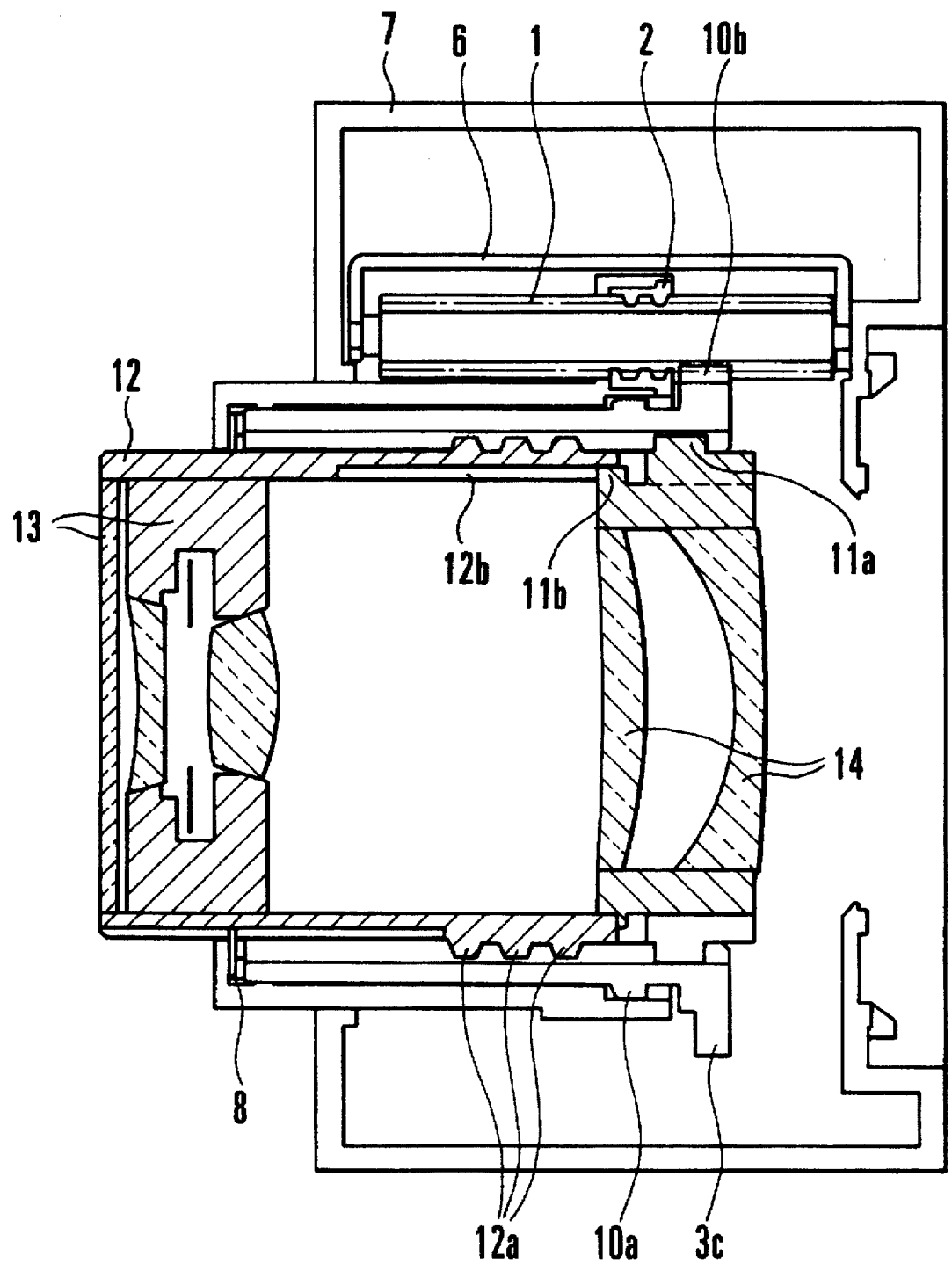
FIG. 8 is a sectional view showing another operating state of the camera shown in FIG. 1.
Figure 9:
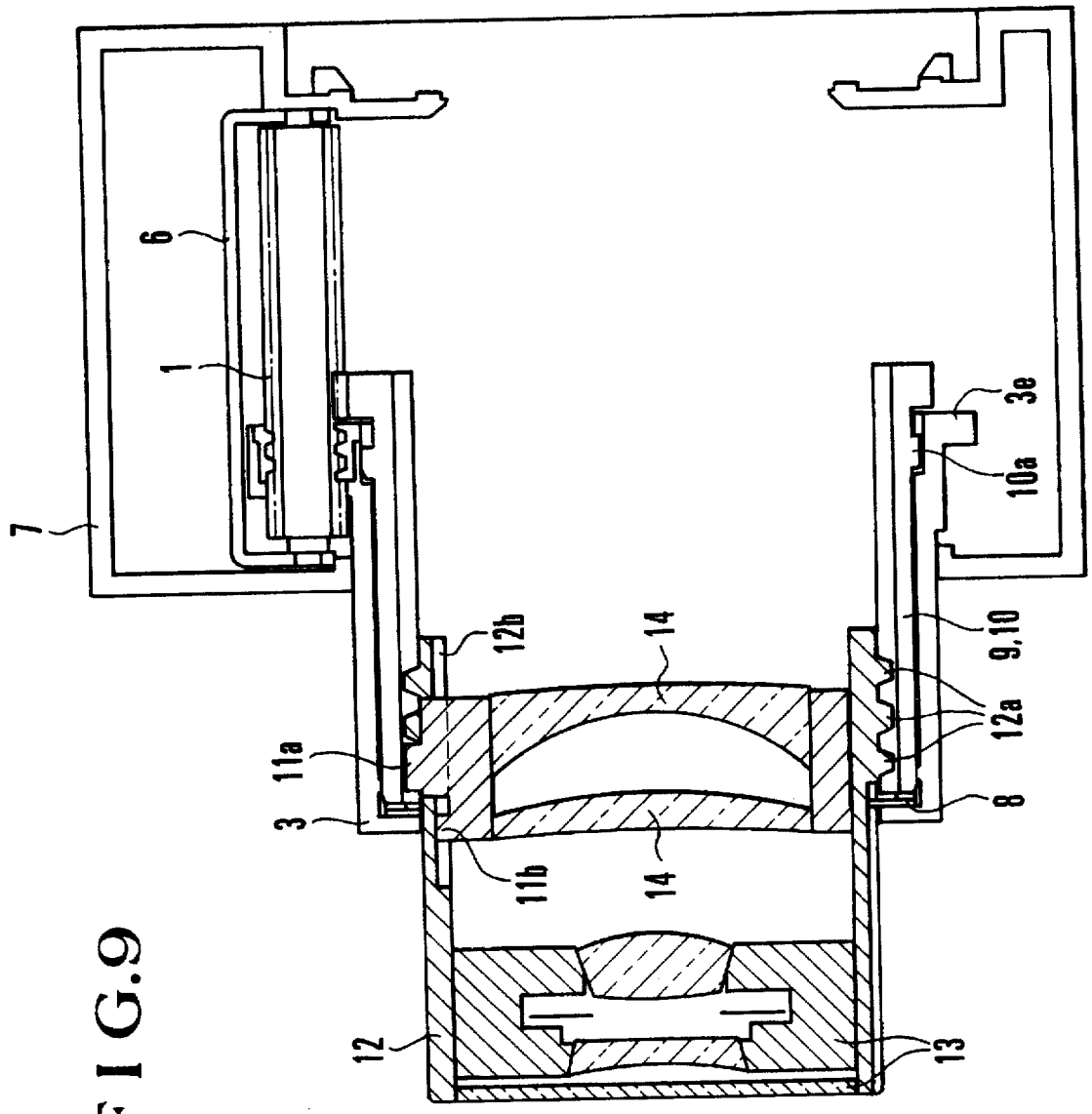
FIG. 9 is a sectional view showing a further operating state of the camera shown in FIG. 1.

Next, referring to FIGS. 7, 8 and 9, a lens-barrel differential mechanism which operates by using the spur-gear helicoid and the front and the rear cam ring mechanism is described. In the case of this embodiment, a two-group zooming differential mechanism is arranged such that the front group tube 12 and the rear group tube 11 are drawn in and out within the lens barrel 3 while the lens barrel 3 is moving back and forth in the direction of the optical axis.

FIG. 7 shows the camera having the whole lens barrel mechanism in a stowed state (the camera being in an inoperative state). FIG. 8 shows the camera having the lens barrel in a wide-angle end position. FIG. 9 shows the camera having the lens barrel in a telephoto end position. These figures jointly show the movement of the front group tube 12 and that of the rear group tube 11 caused by the cam arrangement of the front and rear cam rings 9 and 10 which are drawn out, while rotating, by the drawn-out movement of the lens barrel 3 in the direction of the optical axis when the spur-gear helicoid 1 is rotated by a driving force which is not shown.

In the three different states mentioned above, the relation of the raised male helicoid strips 12a and the cam pins 11a to the female helicoid grooves 9d and 10d of the front and rear cam rings 9 and 10 and the front and rear cam faces 9c and 10c is shown in FIGS. 5 and 6. As apparent from these figures, the front group tube 12 which is in helicoid engagement moves in the direction of the optical axis always in a linear functional manner in relation to the amount of rotation of the front and rear cam rings 9 and 10. The rear group tube 11, on the other hand, moves as desired on the conditions set by the mechanism from the stowed position up to the wide-angle end position and, after that, can be moved non-linearly along the front and rear cam faces 9c and 10c from the wide-angle end position to the telephoto end position, with the cam faces 9c and 10c non-linearly formed according to the optical conditions. However, in the case of the drawings referred to above, the front and rear cam faces 9c and 10c are shown approximately in linear shapes for the sake of simplification.

Further, the shape of the raised male helicoid strips 12a can be arranged as large as possible as long as the strips 12a do not interfere with the front and rear cam faces 9c and 10c and not come off the female helicoid grooves 9d and 10d at the stowed position and the wide-angle end position. The larger shape of the raised male helicoid strips 12a enables the front group tube 12 to more strongly engage the front and rear cam rings 9 and 10. With the embodiment arranged in this manner, even if the front group tube 12 happens to receive some external force while it is in a state of protruding to the outside, as shown in FIG. 9, the impact force is transmitted to the male and female helicoids which have a wide contact area. These parts are, therefore, not easily deformed or damaged by any accidental collision with something.

Further, if the rotation angles of the front and rear cam rings 9 and 10 or the leads of helicoids are determined in such a manner that the raised male helicoid strips 12a engage the female helicoid grooves 9d of the front cam ring 9 when the lens barrel is in a position between a wide-angle end and telephoto end positions with the camera in use, a distance related to optical performance between front and rear groups of optical parts 13 and 14 can be determined by the individual precision of the same parts of the female helicoid grooves 9d and the front cam face 9c of the front cam ring 9. Therefore, the optical performance can be easily enhanced as desired.

Figure 10:
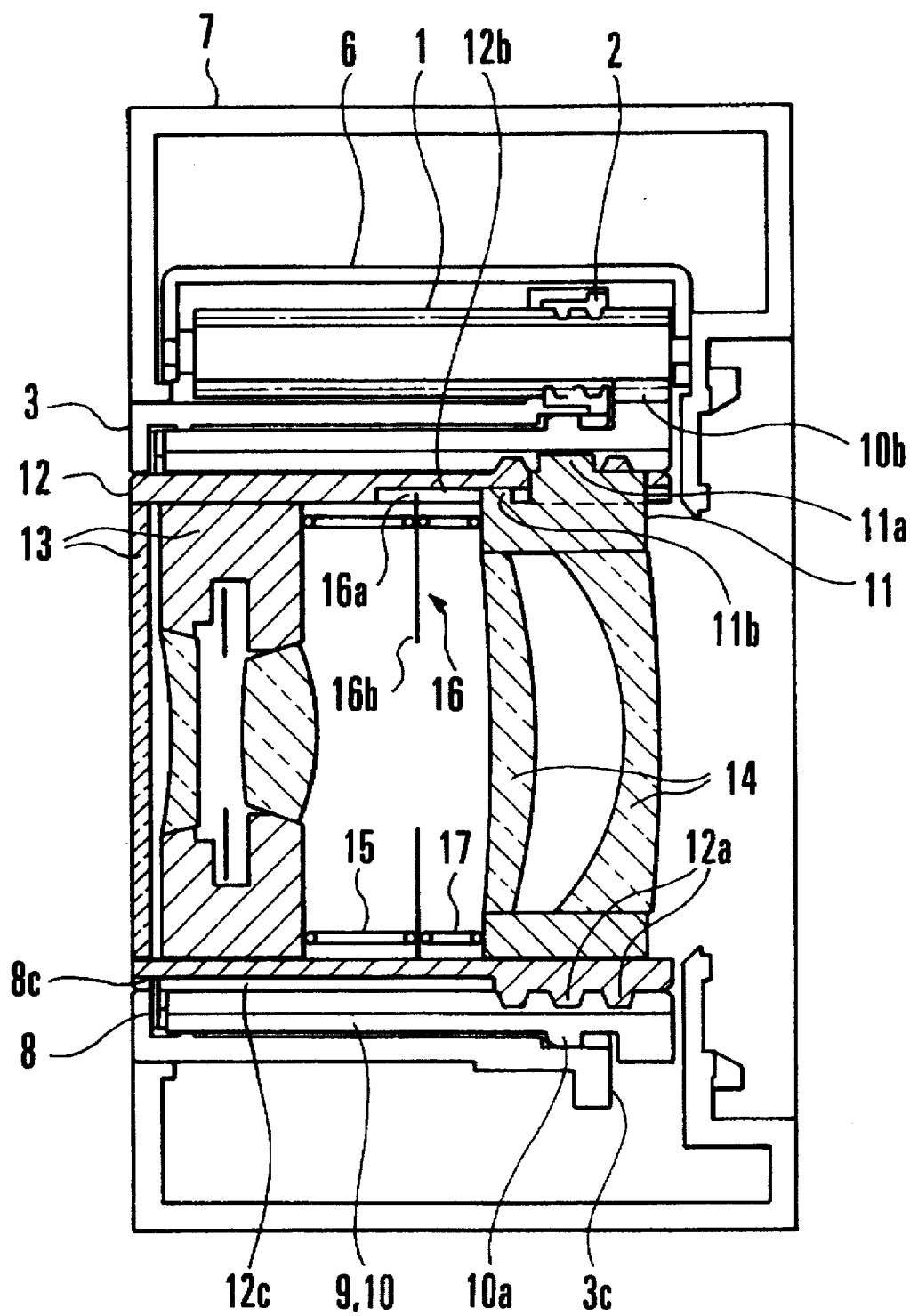
FIG. 10 is a sectional view showing an operating state of a camera arranged according to the invention as a second embodiment thereof.
Figure 11:
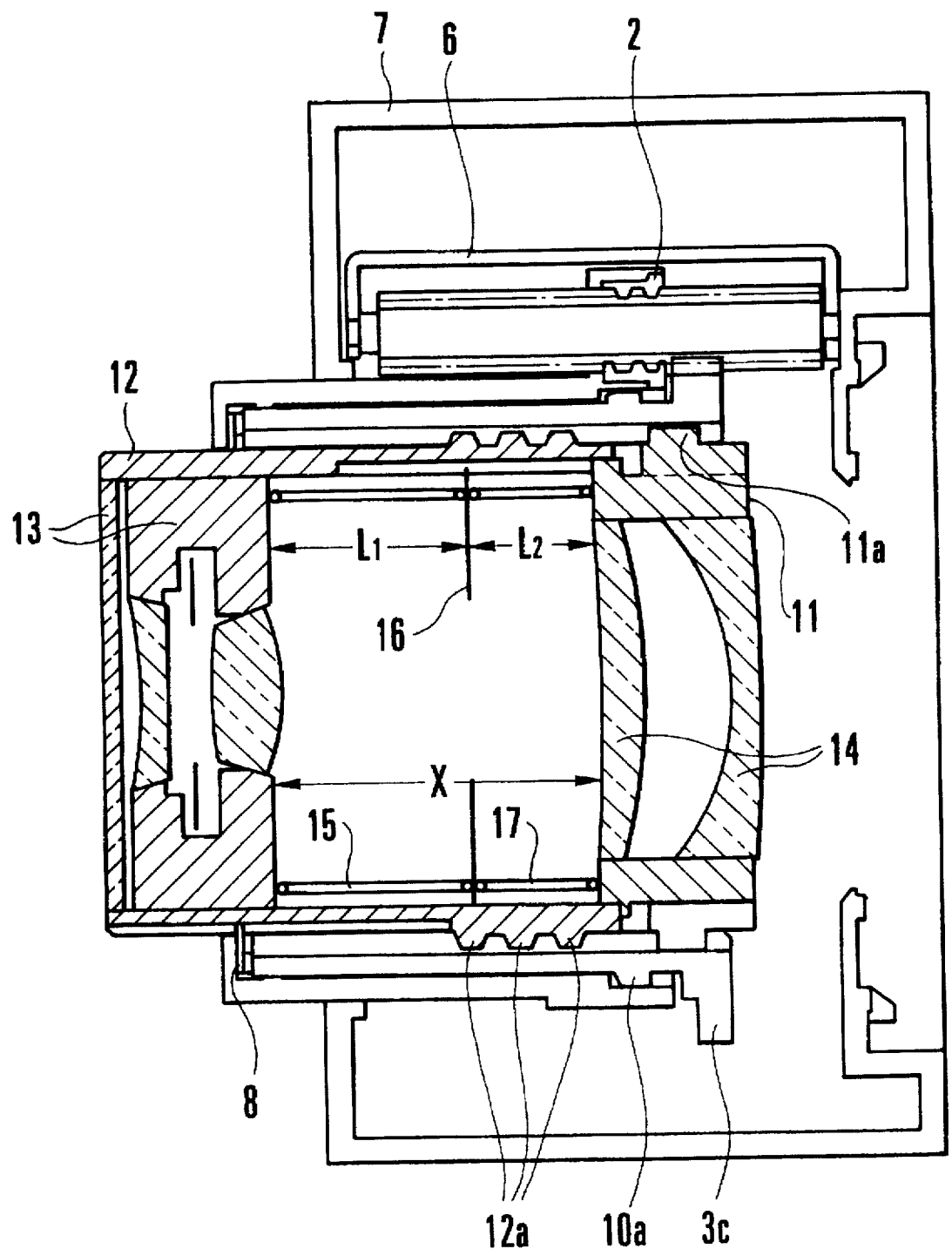
FIG. 11 is a sectional view showing another operating state of the camera arranged as the second embodiment of the invention.
Figure 12:
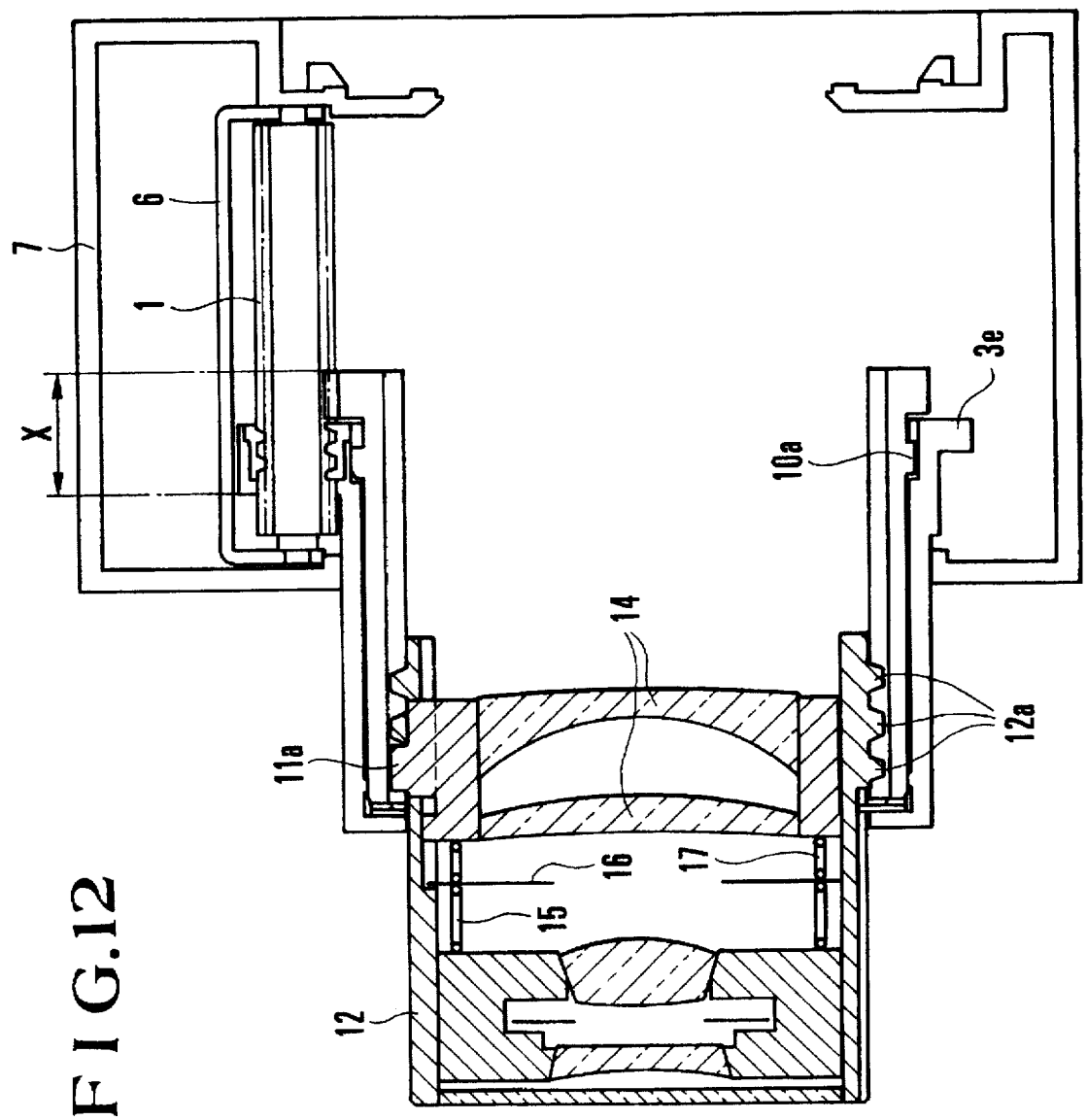
FIG. 12 is a sectional view showing a further operating state of the camera arranged as the second embodiment of the invention.

Next, a second embodiment of the invention which has an intermediate moving stop (diaphragm) mechanism is described with reference to FIGS. 10, 11 and 12 as follows. The parts of the second embodiment which are identical with those shown in FIGS. 7, 8 and 9 are indicated by the same reference numerals and are omitted from description.

Between the front group optical part 13 within the front group tube 12 and the rear group tube 11, there are arranged in the order of, from the front of the camera body 7, a front spring 15, an intermediate moving stop 16 and a rear spring 17. These springs 15 and 17 are compression springs and arranged to suppress any rattling between the optical parts 13 and 14 within the lens barrel 3. The intermediate moving stop 16 is provided with a hole 16b which is in a minimum possible size that does not block an optical path necessary for photographing. The intermediate moving stop 16 which is in a state of being sandwiched in between the springs 15 and 17 is further provided with projections 16a. The projections 16a are arranged at three parts in phase with the projections 11b of the rear group tube 11 and to be slidable along the grooves 12b within the front group tube 12. This arrangement enables the intermediate moving stop 16 to move in the direction of the optical axis without rotating within the front group tube 12. The intermediate moving stop 16 is always located where the compression forces of the front and rear springs 15 and 17 become equal to each other.

With the second embodiment of the invention arranged as described above, when a distance between the front group tube 12 and the rear group tube 11 is caused to vary by the rotation of the front and rear cam rings 9 and 10 (see FIGS. 10 to 12), the intermediate moving stop 16 moves according to the spring force within the front group tube 12. In each of FIGS. 10 to 12, while the sectional view is taken across the middle part of the embodiment along the optical axis, other parts are partly turned around to show the states of fitting engagement of parts and engagement of grooves and projections.

Next, the moving amount of the intermediate moving stop 16 in relation to changes taking place in the distance between the front group optical part 13 and the rear group optical part 14, that is, the spacing distance between the front group tube 12 and the rear group tube 11, is described. Numerical values to be used for following description are first defined as follows:

X: A distance between the front optical part 13 and the rear group tube 11. (See FIG. 11)

K1, K2: Spring constants of front and rear springs.

L01, L02: Free lengths of front and rear springs.

L1, L2: Compressed lengths of front and rear springs. (See FIG. 11)

Ignoring the plate thickness of the intermediate moving stop 16 for the sake of simplification, from the balance of the spring forces which gives X=L1+L2, a relation between X and L1 can be expressed as follows:

$$K1\ L01-K2\ L02+K2\ X=L1(K1+K2)$$

This formula indicates that the intermediate moving stop 16 linearly moves between the front group tube 12 and the rear group tube 11 in relation to changes taking place in the distance between them. It further indicates that, if "K1 L01-K2 L02=0", the intermediate moving stop 16 is always located at a point between distances divided by a ratio between the spring constants of the front and rear springs 15 and 17.

Figure 13:
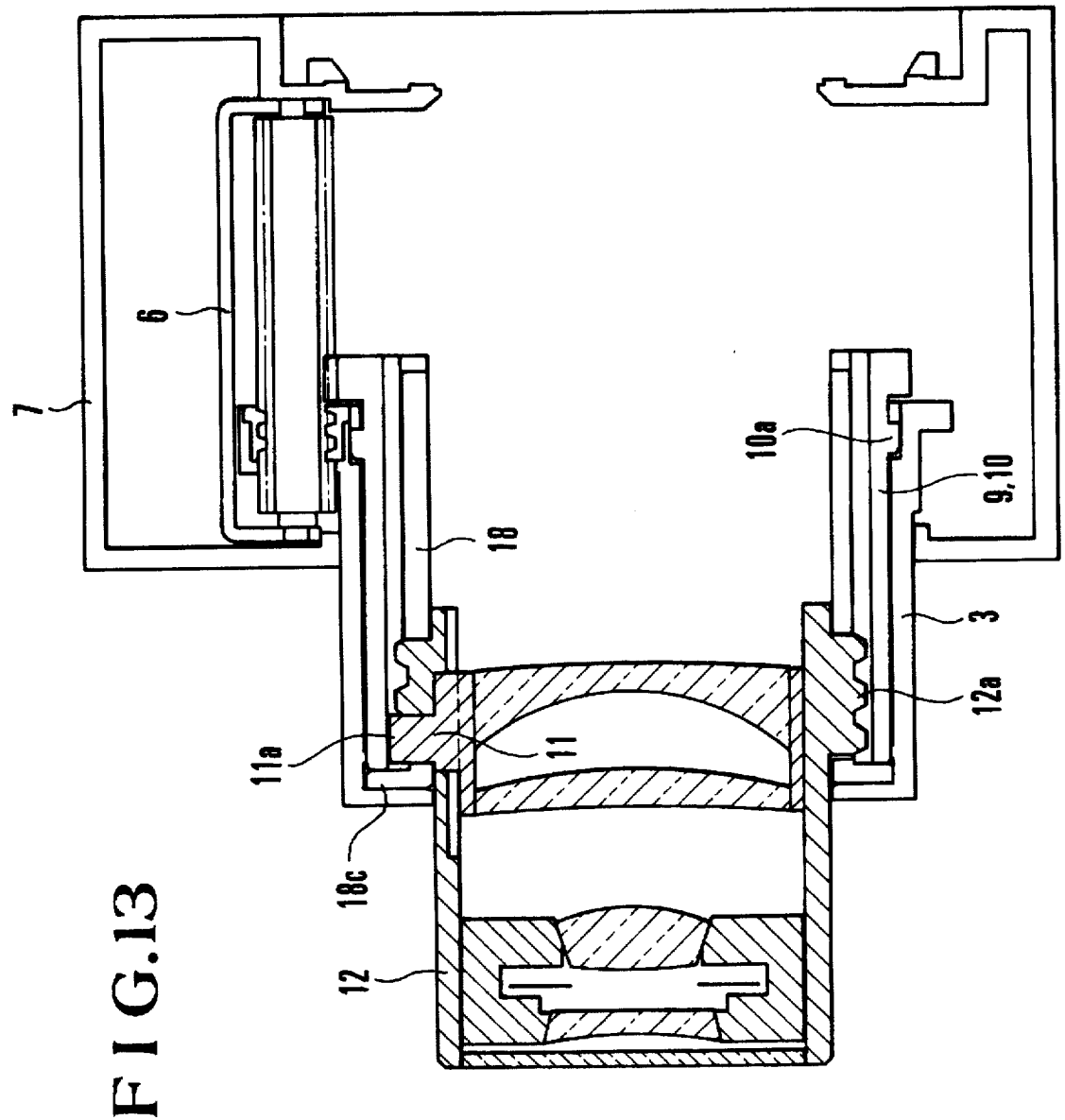
FIG. 13 is a sectional view showing a camera arranged as the third embodiment of the invention.
Figure 14:
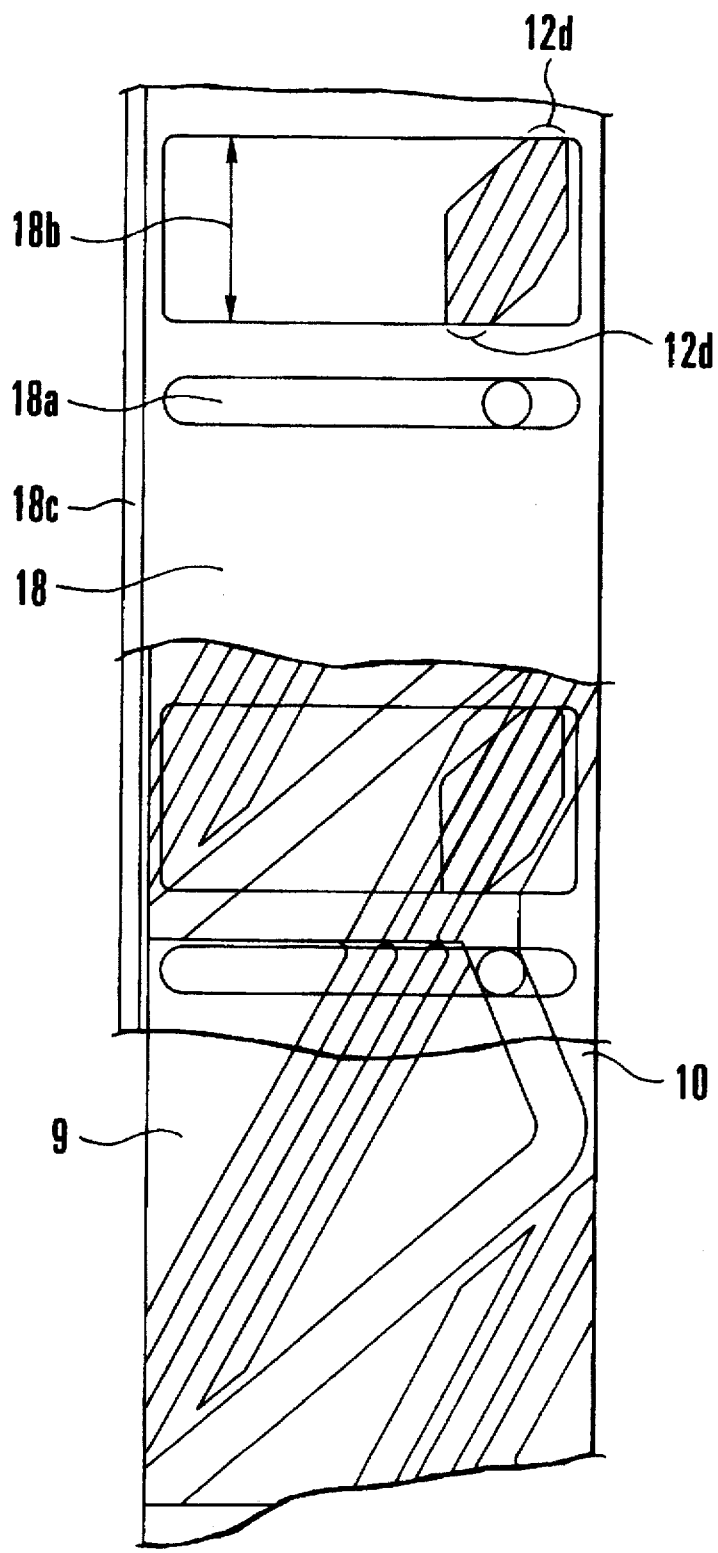
FIG. 14 is a development view showing a part of the camera which is the third embodiment of the invention.

A third embodiment of the invention is described below with reference to FIGS. 13 and 14:

FIG. 13 is a main sectional view of the third embodiment. FIG. 14 is an outside development view showing the cam arrangement of the third embodiment. In this case, a rectilinear movement tube 18 is provided for restricting the rotation of the front and rear group tubes 12 and 11. The rectilinear movement tube 18 has a total of six linear slots, i.e., three for the front group tube 12 and three for the rear group tube 11, which are arranged to allow the raised male helicoid strips 12a and the cam pins 11a to slide only in the direction of the optical axis. To prevent rotation relative to the lens barrel 3, a flange part 18c of the rectilinear movement tube 18 is provided with notches which are not shown. Each of the contact parts 12d of the raised male helicoid strips 12a is arranged to have a sufficient area for contact with the rectilinear movement slots 18b which allow the sliding movement of the raised male helicoid strips 12a.

With the third embodiment arranged in this manner, when the front and rear cam rings 9 and 10 rotate, the front and rear group tubes 12 and 11 are drawn out in a state of having their rotation restricted by the rectilinear movement tube 18.

A fourth embodiment of the invention is described as follows. FIGS. 15(a) and 15(b) show the essential parts of the fourth embodiment of the invention. FIG. 15(a) is a front view showing only a gear part. FIG. 15(b) is a main sectional view. A rod-like gear 19 is a spur gear which is in a long rod-like shape and is hung on a guide press 6. A lens barrel 20 has a spur-gear helicoid 20a formed to extend over the whole circumference of the lens barrel 20. The spur-gear helicoid consists of a helicoid part and a spur gear part arranged in a state of spatially overlapping each other to have a certain width W. The spur gear part of the spur-gear helicoid 20a engages the rod-like gear 19. The helicoid part engages the female helicoid 18a of a female helicoid tube 18 which is secured to the camera body 7. The female helicoid tube 18 is provided with a cutout 18c which extends over the whole width of the female helicoid tube 18 to allow the rod-like gear 19 to enter there. With the fourth embodiment arranged in this manner, when the rod-like gear 19 is caused to rotate by a driving force which is not shown, the lens barrel 20 is drawn out while rotating. The fourth embodiment has, in the same manner as the first embodiment, the front and rear cam rings 9 and 10 which are disposed within the lens barrel 20 and the front and rear group tubes 12 and 11 which are disposed within the front and rear cam rings 9 and 10. A rotation stopping plate 21 is secured to the rear of the rear cam ring 10. The rotation stopping plate 21 has a projection 21a which is arranged to come into sliding contact with a groove 18b provided in the female helicoid tube 18.

The arrangement described above forms a differential mechanism whereby, while the lens barrel 20 is rotatingly drawn out, the front and rear cam rings 9 and 10 which are reversely restrained from rotating within the lens barrel 20 cause the front and rear group tubes 12 and 11 to be drawn out.

Figure 16:
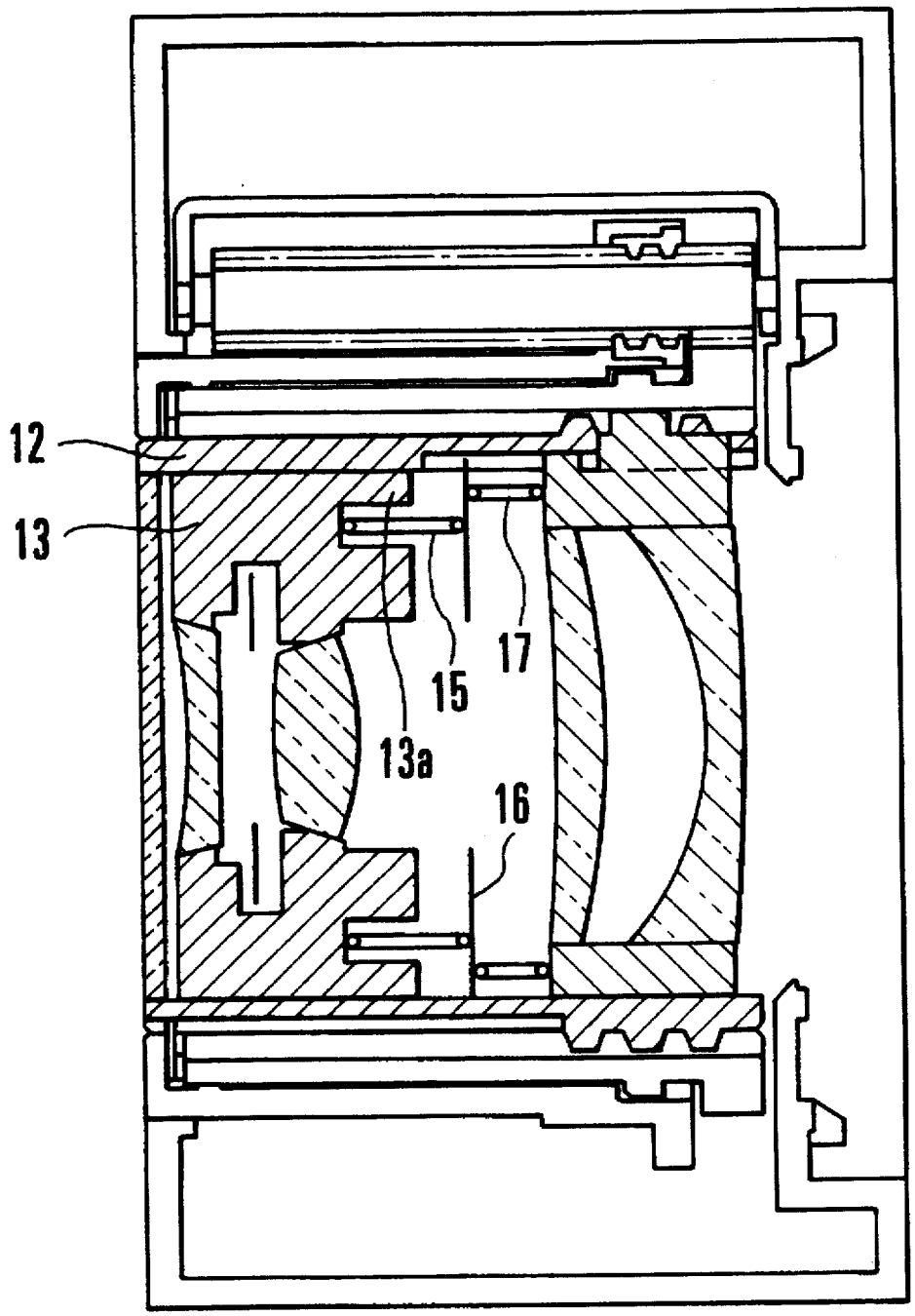
FIG. 16 is a sectional view showing a camera arranged as a fifth embodiment of the invention.

A fifth embodiment of the invention is described as follows. FIG. 16 is a main sectional view showing the fifth embodiment. Depending on the structural arrangement of a front group optical part 13, a functional part or a structural part 13a might come into an area near the inner circumference of a front group tube 12. However, since front and rear springs 15 and 17 are connected by an intermediate moving stop (diaphragm) 16, the above-stated inconvenience can be avoided by arranging the front and rear springs 15 and 17 to have different coil diameters instead of arranging them in the shape of trapezoidal compression springs. Their functions can be sufficiently accomplished by such arrangement.

Figure 17:
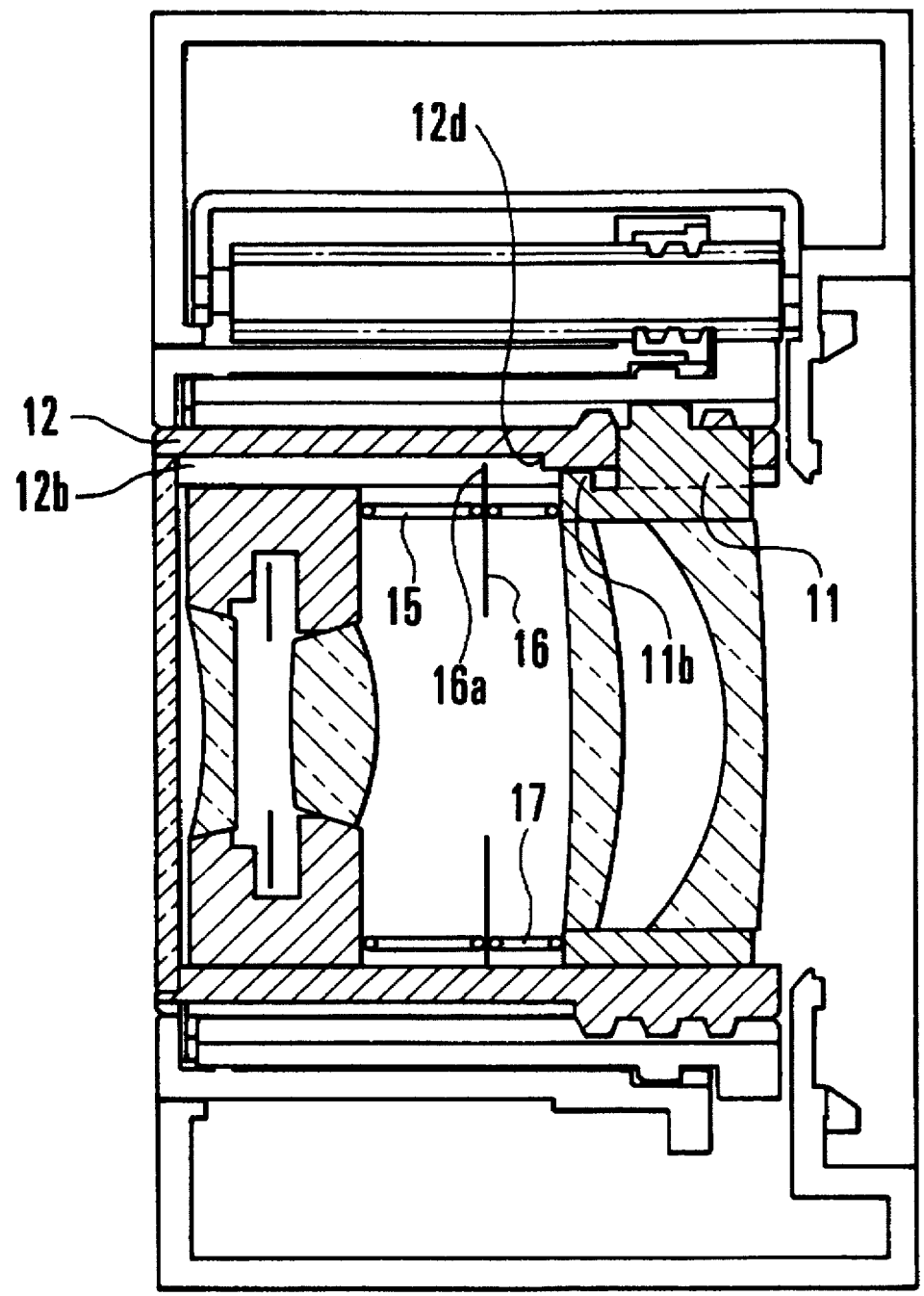
FIG. 17 is a sectional view showing an operating state of a camera arranged according to the invention as a sixth embodiment thereof.
Figure 18:
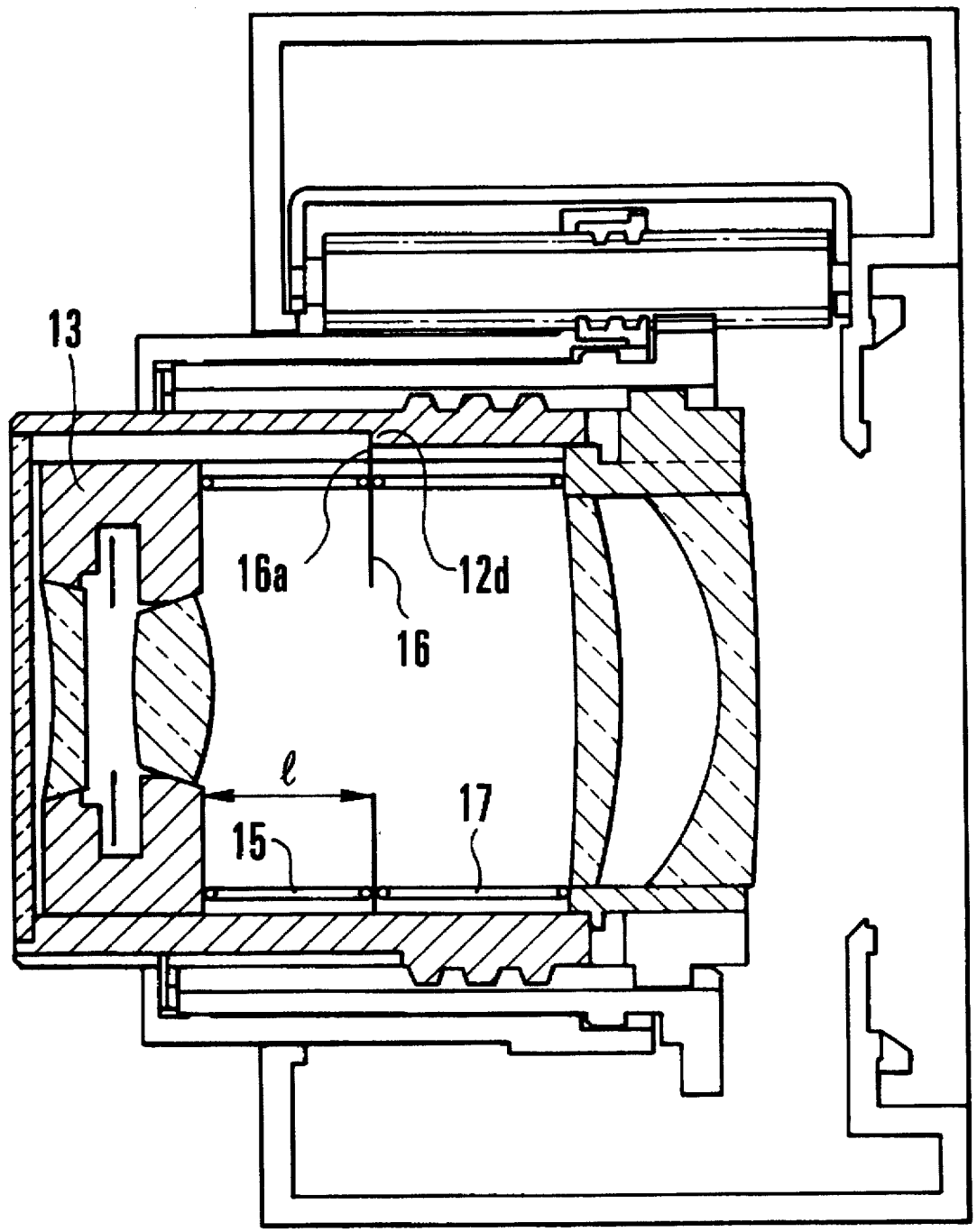
FIG. 18 is a sectional view showing another operating state of the camera arranged as the sixth embodiment of the invention.
Figure 19:
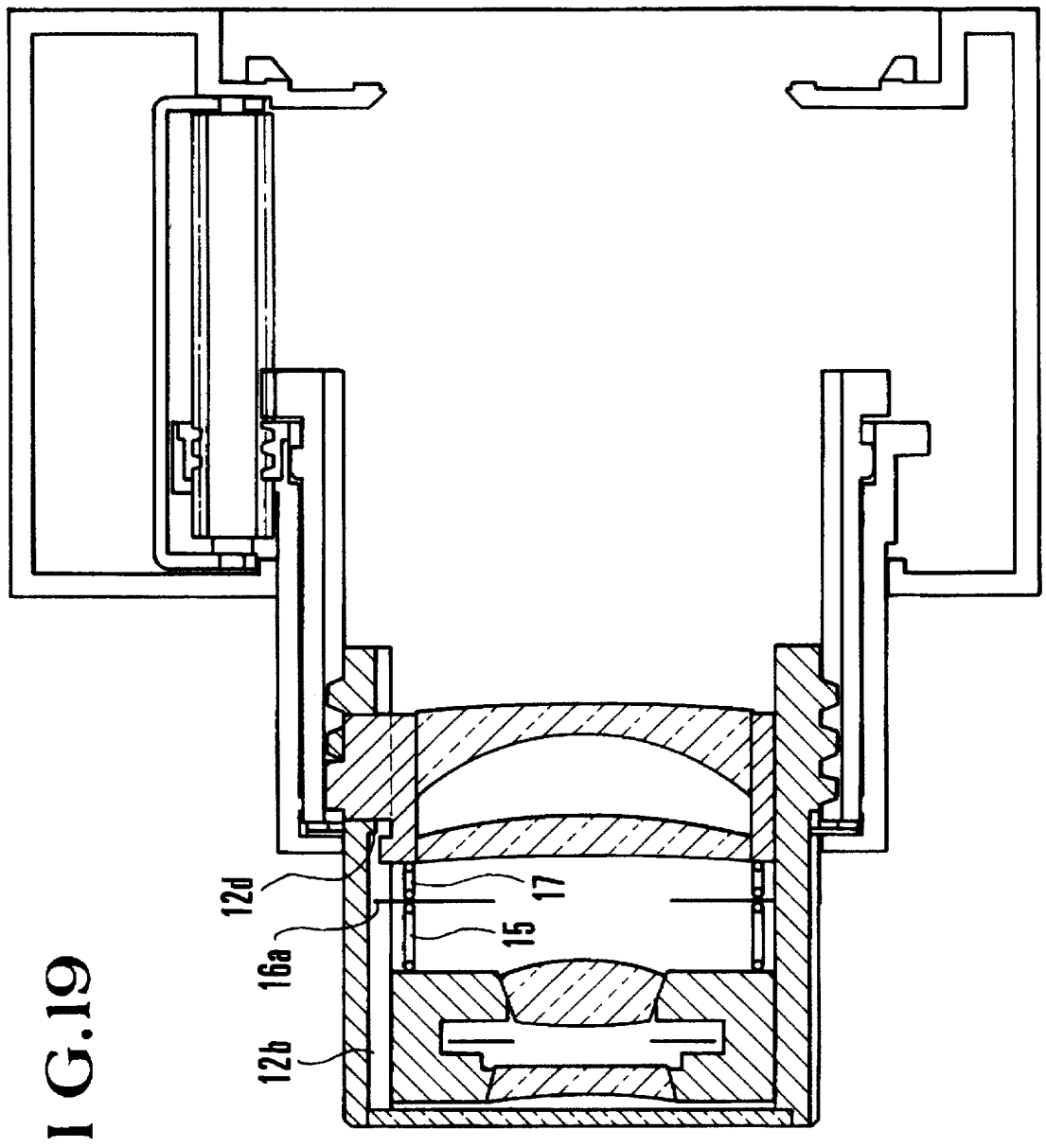
FIG. 19 is a sectional view showing a further operating state of the camera arranged as the sixth embodiment of the invention.
Figure 20:
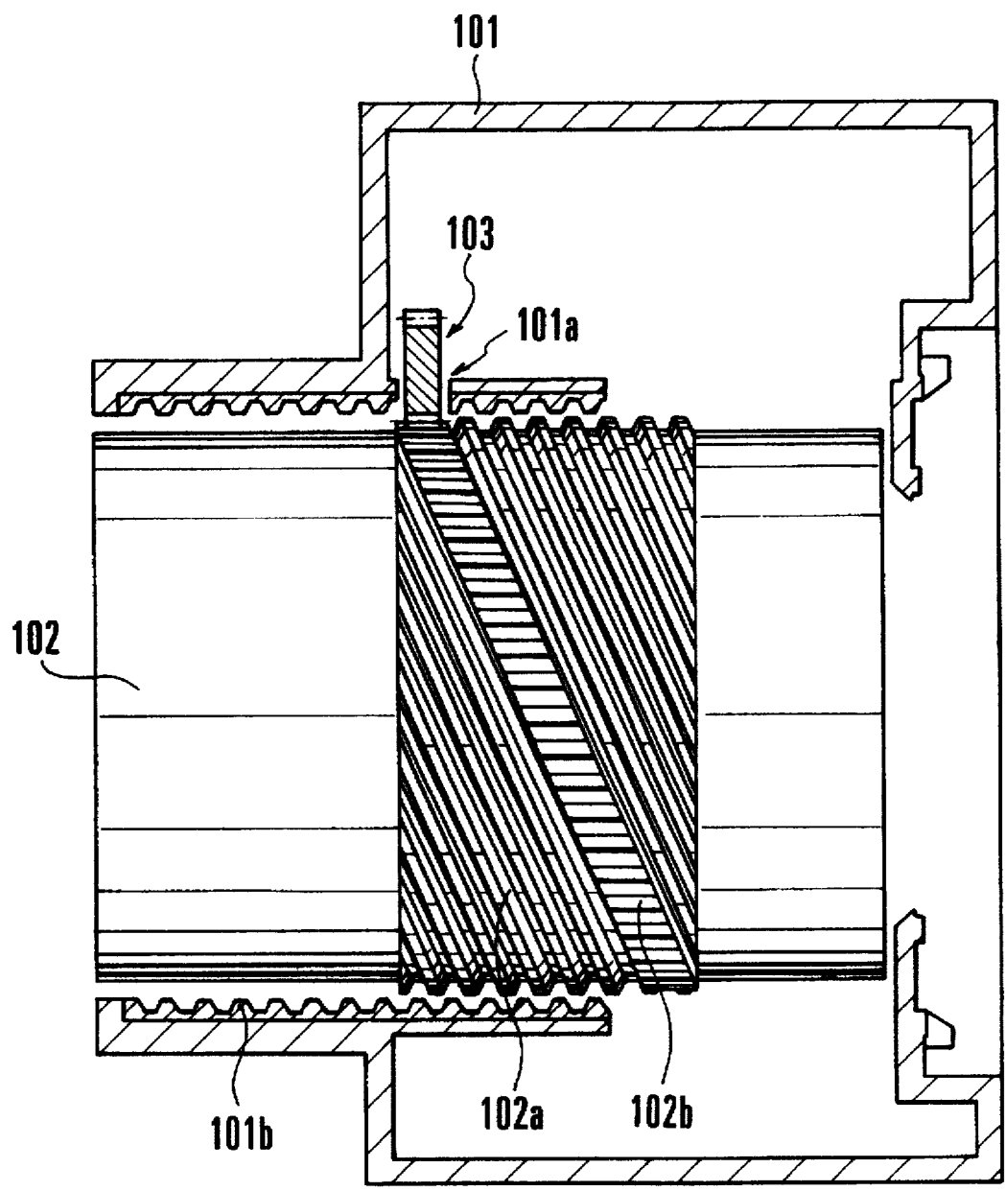
FIG. 20 is a sectional view showing by way of example the arrangement of the conventional camera.
Figure 21:
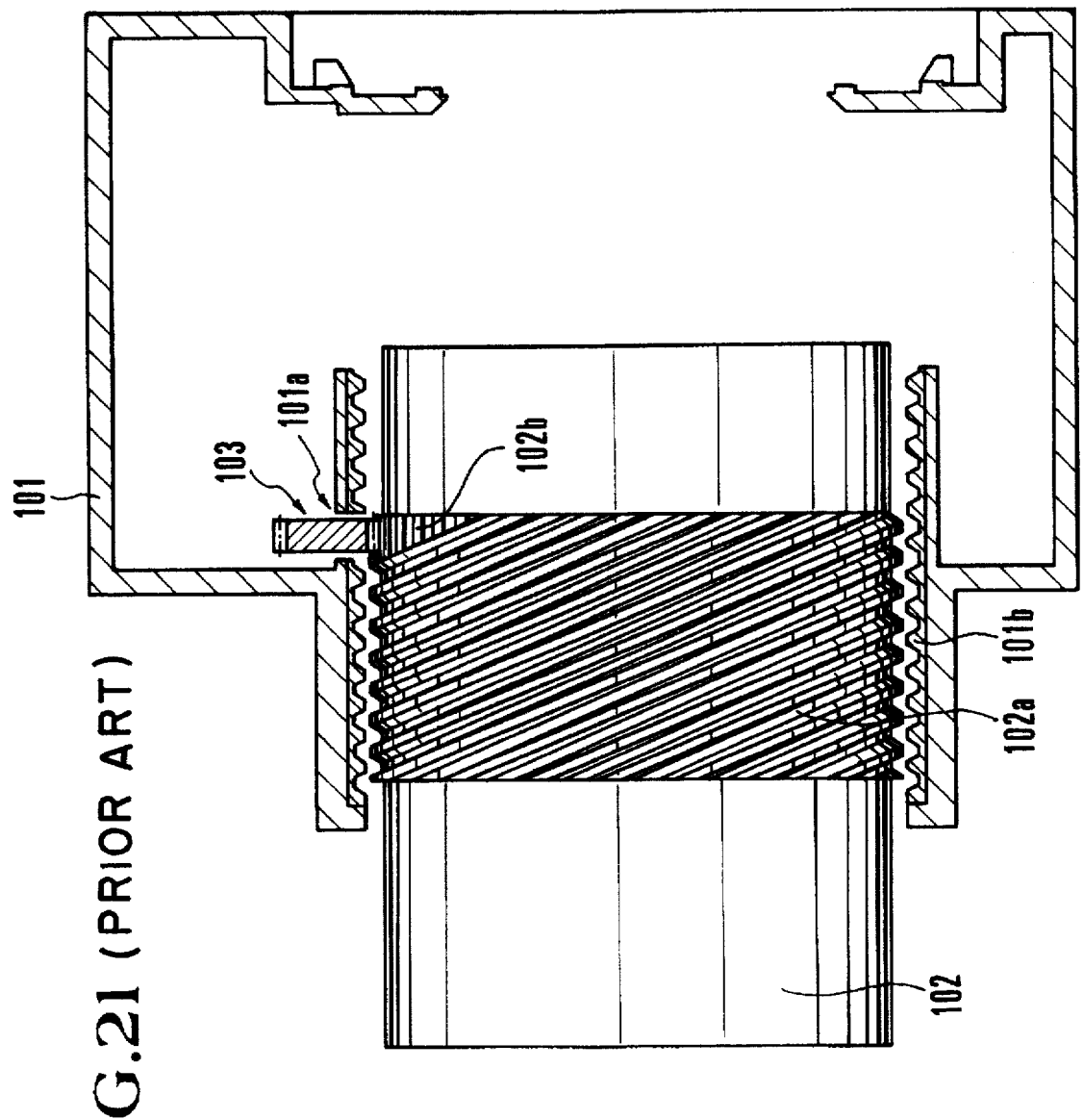
FIG. 21 is a sectional view showing the arrangement of the conventional camera.

A sixth embodiment of the invention is described follows. FIGS. 17, 18 and 19 are main sectional views of a camera showing the sixth embodiment.

Referring to FIG. 17 which shows the camera in an inoperative state, grooves 12b which are provided for restraining an intermediate moving stop (diaphragm) 16 and a rear group tube 11 from rotating are arranged to have stepped parts 12d. The stepped parts 12d are arranged to allow the rear group tube 11 without restricting the projections 11b of the rear group tube 11 to freely slide in the direction of the optical axis within a front group tube 12. For projections 16a provided on the intermediate moving stop 16, however, the stepped parts 12d act as abutting parts to prevent the intermediate moving stop 16 from moving further toward a film surface than the stepped parts 12d within the front group tube 12.

Therefore, when the camera is in a wide-angle end position as shown in FIG. 18, the intermediate moving stop 16 is kept at a distance l from a front group optical part 13 irrespective of the spring forces of front and rear springs 15 and 17. However, when the whole camera comes to vary a focal length position toward a telephoto end position, the projections 16a come to no longer abut on the stepped parts 12d at a certain point. The intermediate moving stop 16 then begins to move according to a balance between the spring forces of the front and rear springs 15 and 17, as shown in FIG. 19.

The optical apparatus arranged as each of the embodiments of the invention described in the foregoing gives the following advantages.

(a) The two-group zoom, inner cam arrangement wherein the front group tube is drawn out by the helicoid fitting engagement enables the embodiment to be arranged to have its optical performance unimpaired by an impact on the front group tube. The front cam ring 9 and the rear cam ring 10 can be formed without any undercut of their cam faces that has presented a problem in molding with respect to the structural arrangement of the mold. The optical performance with respect to the extents to which the front and rear group tubes 12 and 11 are to be drawn out can be accurately controlled through the individual precision of the front cam ring 9 as a discrete part.

(b) The use of the spur-gear helicoid which is arranged to have a helicoid part and a spur gear part spatially overlapping each other enables a transmission part which transmits necessary drawing-out and rotating forces to move. Therefore, in the differential mechanism which simultaneously performs the drawing-out action and transmission of the rotating force on the lens barrel, the spur-gear helicoid enables these actions to be carried out within a short width in the direction of the optical axis. The camera or the like, therefore, can be more compactly or flatly arranged.

(c) The mechanism arranged to have the intermediate moving stop (or diaphragm) carried by the two compression springs enables the intermediate moving stop to linearly move according to changes taking place in the distance between the lens groups. The locus of the movement of the intermediate moving stop is easily adjustable as desired by varying the conditions of these compression springs. The intermediate moving stop can be simply arranged to function within a space between the lens groups where it is not easy to insert a structural part. Even in a case where the inside structural arrangement of the lens barrel otherwise necessitates use of trapezoidal compression springs, the invented mechanism permits ordinary springs to be connected in such a way as to save a space otherwise required for expanding and compressing the trapezoidal compression springs. The provision of a member which restricts the movement of the intermediate moving stop enables the intermediate moving stop to have a more complex locus of movement than the locus obtainable by the balance of spring forces.

In each of the embodiments described, the relation between the male and female helicoids or the relation between the cam pins and the cam grooves of course may be reversed.

Further, while the invention is applied to the arrangement of a lens barrel in each of the embodiments described, the invention of course applies also to the arrangement of devices other than lens barrels.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A lens barrel comprising:
   a) a spur-gear helicoid having a spur gear part and a helicoid part arranged to spatially overlap each other;
   b) a spur gear engaging said spur gear part of said spur-gear helicoid;
   c) a helicoid engaging a part of said helicoid part of said spur-gear helicoid; and
   d) a lens barrel system to which a rotation force is transmitted by the engagement between said spur gear part and said spur gear and to which a moving force in the direction of an optical axis is transmitted by the engagement between said helicoid part and said helicoid, wherein said spur-gear helicoid moves in the direction of the optical axis by the moving force.

2. A lens barrel according to claim 1, wherein said spur-gear helicoid is disposed in said lens barrel system.

3. A lens barrel according to claim 2, wherein said spur gear which engages the spur gear part of said spur-gear helicoid is arranged to transmit a driving force to said spur gear part.

4. A lens barrel according to claim 3, wherein said spur gear is arranged on a rod-like member.

5. A lens barrel comprising:
   a) a spur-gear helicoid having a spur gear part and a helicoid part arranged to spatially overlap each other;
   b) a spur gear engaging said spur gear part of said spur-gear helicoid;
   c) a helicoid engaging a part of said helicoid part of said spur-gear helicoid; and
   d) an operating system to which a rotation force is transmitted by the engagement between said spur gear part and said spur gear and to which a moving force in the direction of an optical axis is transmitted by the engagement between said helicoid part and said helicoid, wherein said spur-gear helicoid moves in the direction of the optical axis by the moving force.

6. A lens barrel according to claim 5, wherein said spur-gear helicoid is disposed in said operating system.

7. A lens barrel according to claim 6, wherein said spur gear which engages said spur gear part of said spur-gear helicoid is arranged to transmit a driving force to said spur gear part.

8. A lens barrel according to claim 7, wherein said spur gear is arranged on a rod-like member.

9. An optical apparatus comprising:
   a) a spur-gear helicoid having a spur gear part and a helicoid part arranged to spatially overlap each other;
   b) a spur gear engaging said spur gear part of said spur-gear helicoid;
   c) a helicoid engaging a part of said helicoid part of said spur-gear helicoid; and
   d) a lens barrel system to which a rotation force is transmitted by the engagement between said spur gear part and said spur gear and to which a moving force in the direction of an optical axis is transmitted by the engagement between said helicoid part and said helicoid, wherein said spur-gear helicoid moves in the direction of the optical axis by the moving force.

10. An optical apparatus according to claim 9, wherein said spur-gear helicoid is disposed in said lens barrel system.

11. An optical apparatus according to claim 10, wherein said spur gear which engages the spur gear part of said spur-gear helicoid is arranged to transmit a driving force to said spur gear part.

12. An optical apparatus according to claim 11, wherein said spur gear is arranged on a rod-like member.

13. An optical apparatus according to claim 11, wherein said helicoid which engages the helioid part of said spur-gear helicoid is secured to said lens barrel system.

14. An optical apparatus according to claim 9, wherein said spur gear and said helicoid are disposed in said lens barrel system.

15. An optical apparatus according to claim 14, wherein said lens barrel system includes a first lens barrel which has said spur gear and a second lens barrel which has said helicoid.

16. An optical apparatus according to claim 15, wherein said first lens barrel is arranged to be rotatable relative to said second lens barrel.

17. An optical apparatus according to claim 14, wherein said lens barrel system has said spur gear arranged to be rotatable relative to said helicoid.

18. An optical apparatus according to claim 14, wherein said spur-gear helicoid is arranged to transmit a driving force to said spur gear and said helicoid.

19. An optical apparatus according to claim 18, wherein said spur-gear helicoid is arranged on a rod-like member.

20. An optical apparatus comprising:
   a) a spur-gear helicoid having a spur gear part and a helicoid part arranged to spatially overlap each other;
   b) a spur gear engaging said spur gear part of said spur-gear helicoid;
   c) a helicoid engaging a part of said helicoid part of said spur-gear helicoid; and
   d) an operating system to which a rotation force is transmitted by the engagement between said spur gear part and said spur gear and to which a moving force in the direction of an optical axis is transmitted by the engagement between said helicoid part and said helicoid, wherein said spur-gear helicoid moves in the direction of the optical axis by the moving force.

21. An optical apparatus according to claim 20, wherein said spur-gear helicoid is disposed in said operating system.

22. An optical apparatus according to claim 21, wherein said spur gear which engages said spur gear part of said spur-gear helicoid is arranged to transmit a driving force to said spur gear part.

23. An optical apparatus according to claim 22, wherein said spur gear is arranged on a rod-like member.

24. An optical apparatus according to claim 22, wherein said helicoid which engages said part of said helicoid part of said spur-gear helicoid is secured to said operating system.

25. An optical apparatus according to claim 20, wherein said spur gear and said helicoid are disposed in said operating system.

26. An optical apparatus according to claim 25, wherein said operating system includes a first operating part which has said spur gear and a second operating part which has said helicoid.

27. An optical apparatus according to claim 26, wherein said first operating part is arranged to be rotatable relative to said second operating part.

28. An optical apparatus according to claim 25, wherein said operating system has said spur gear arranged to be rotatable relative to said helicoid.

29. An optical apparatus according to claim 25, wherein said spur-gear helicoid is arranged to transmit a driving force to said spur gear and said helicoid.

30. An optical apparatus according to claim 29, wherein said spur-ger helicoid is arranged on a rod-like member.

31. A camera comprising:
   a) a spur-gear helicoid having a spur gear part and a helicoid part arranged to spatially overlap each other;
   b) a spur gear engaging said spur gear part of said spur-gear helicoid;
   c) a helicoid engaging a part of said helicoid part of said spur-gear helicoid; and
   d) a lens barrel system to which a rotation force is transmitted by the engagement between said spur gear part and said spur gear and to which a moving force in the direction of an optical axis is transmitted by the engagement between said helicoid part and said helicoid, wherein said spur-gear helicoid moves in the direction of the optical axis by the moving force.

32. A camera according to claim 31, wherein said spur-gear helicoid is disposed in said lens barrel system.

33. A camera according to claim 32, wherein said spur gear which engages the spur gear part of said spur-gear helicoid is arranged to transmit a driving force to said spur gear part.

34. A camera according to claim 33, wherein said spur gear is arranged on a rod-like member.

35. A camera comprising:
   a) a spur-gear helicoid having a spur gear part and a helicoid part arranged to spatially overlap each other;
   b) a spur gear engaging said spur gear part of said spur-gear helicoid;
   c) a helicoid engaging a part of said helicoid part of said spur-gear helicoid; and
   d) an operating system to which a rotation force is transmitted by the engagement between said spur gear part and said spur gear and to which a moving force in the direction of an optical axis is transmitted by the engagement between said helicoid part and said helicoid, wherein said spur-gear helicoid moves in the direction of the optical axis by the moving force.

36. A camera according to claim 35, wherein said spur-gear helicoid is disposed in said operating system.

37. A camera according to claim 36, wherein said spur gear which engages the spur gear part of said spur-gear helicoid is arranged to transmit a driving force to said spur gear part.

38. A camera according to claim 37, wherein said spur gear is arranged on a rod-like member.

* * * * *

UNITED STATES PATENT AND TRADEMARK OFFICE
CERTIFICATE OF CORRECTION

PATENT NO. : 5,724,196
DATED : March 3, 1998
INVENTOR(S) : Ichino, Kazushige

It is certified that error appears in the above-indentified patent and that said Letters Patent is hereby corrected as shown below:

Col. 9, line 5, delete "distance 1" and insert -- distance $\lambda$ --.

Signed and Sealed this

Eighteenth Day of August, 1998

Attest:

BRUCE LEHMAN

Attesting Officer     Commissioner of Patents and Trademarks